United States Patent
Tsujimoto

(10) Patent No.: US 8,789,359 B2
(45) Date of Patent: Jul. 29, 2014

(54) EXHAUST GAS PURIFYING SYSTEM OF AN INTERNAL COMBUSTION ENGINE

(75) Inventor: Kenichi Tsujimoto, Mishima (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 118 days.

(21) Appl. No.: 13/638,510

(22) PCT Filed: Apr. 1, 2010

(86) PCT No.: PCT/JP2010/002419
§ 371 (c)(1),
(2), (4) Date: Sep. 28, 2012

(87) PCT Pub. No.: WO2011/125089
PCT Pub. Date: Oct. 13, 2011

(65) Prior Publication Data
US 2013/0022505 A1    Jan. 24, 2013

(51) Int. Cl.
*F01N 3/00*    (2006.01)

(52) U.S. Cl.
USPC ............... 60/286; 422/109; 422/168; 60/299; 60/303

(58) Field of Classification Search
None
See application file for complete search history.

(56) References Cited

U.S. PATENT DOCUMENTS

2003/0010022 A1    1/2003    Suzuki

FOREIGN PATENT DOCUMENTS

| JP | 2001-065335 A | 3/2001 |
| JP | 2003-090271 A | 3/2003 |
| JP | 2005-083262 A | 3/2005 |
| JP | 2006-501390 A | 1/2006 |
| JP | 2007-321718 A | 12/2007 |
| JP | 2010-059886 A | 3/2010 |
| WO | 03/048536 A1 | 6/2006 |

*Primary Examiner* — Walter D Griffin
*Assistant Examiner* — Jelitza Perez
(74) *Attorney, Agent, or Firm* — Sughrue Mion, PLLC

(57) ABSTRACT

An exhaust purification system of an internal combustion engine, having an exhaust purification catalyst in the exhaust passage of the engine of a vehicle, a fuel supply device provided in the exhaust passage upstream the exhaust purification catalyst and supplies fuel to an exhaust gas flowing into the catalyst, a heating device which heats the fuel supplied from the fuel supply device, and a controller which controls the heating device. The controller controls the heating device, when a first processing request based on a state of the exhaust purification catalyst is standing and a second processing request based on an operating state of the vehicle is not standing (t2), to a pre-heating temperature lower than an ignition threshold capable of igniting the fuel and, when the first processing request and the second processing request are standing (t3), to an ignition temperature higher than the ignition threshold.

8 Claims, 3 Drawing Sheets

EXHAUST GAS PURIFYING SYSTEM OF AN INTERNAL COMBUSTION ENGINE

CROSS REFERENCE TO RELATED APPLICATIONS

This application is a National Stage of International Application No. PCT/JP2010/002419 filed Apr. 1, 2010, the contents of all of which are incorporated herein by reference in their entirety.

TECHNICAL FIELD

The present invention relates to an exhaust gas purifying system provided with a fuel supply device which supplies fuel to an exhaust purifying catalyst provided in an exhaust passage of an internal combustion engine.

BACKGROUND ART

A catalytic combustion device having the function of supplying fuel to a catalyst arranged in the exhaust passage of the internal combustion engine was proposed (See Patent Literature 1, for example). In this device, fuel is supplied to the catalytic combustion section by a main injector, while the fuel injected from a sub injector is ignited by a spark plug, and the catalytic combustion section is pre-heated by the flame.

In a device disclosed in Patent Literature 2, electricity is made to flow between a central electrode and an outer-peripheral electrode incorporated in the catalyst for purifying exhaust gas so as to pre-heat the catalyst before the engine is started.

CITATION LIST

Patent Literature

[Patent Literature 1] Japanese Patent Laid-Open No. 2001-65335
[Patent Literature 2] Japanese Patent Laid-Open No. 2007-321718

SUMMARY OF THE INVENTION

Problems to be Solved by the Invention

However, with the above-described device in Patent Literature 1, deterioration of emission caused by a delay in the ignition of fuel injected from the sub injector is not considered. Moreover, since the device in the above-described Patent Literature 2 does not supply fuel to the catalyst, deterioration of the emission caused by the fuel supplied to the catalyst is not considered.

The present invention has the objective to provide new measure capable of suppressing deterioration of the emission caused by an ignition delay of fuel supplied to the catalyst.

Solution to the Problems

An aspect of the present invention is an exhaust purification system of an internal combustion engine, comprising:
an exhaust purification catalyst provided in the exhaust passage of the internal combustion engine in a vehicle;
a fuel supply device which is provided in the exhaust passage upstream the exhaust purification catalyst and supplies fuel to the exhaust gas flowing into the exhaust purification catalyst;
a heating device which heats the fuel supplied from the fuel supply device; and
a controller which controls the heating device, wherein
the controller controls the heating device to a pre-heating temperature lower than the ignition threshold value capable of igniting the fuel if the first processing request based on the state of the exhaust purification catalyst is standing and a second processing request based on the operation state of the vehicle is not standing, and
controls the heating device to an ignition temperature higher than the ignition threshold value if the first processing request and the second processing request are standing.

In this aspect, the controller controls the heating device to the pre-heating temperature lower than the ignition temperature if the first processing request based on the state of the exhaust purification catalyst is standing and the second processing request based on the operation state of the vehicle is not standing. Moreover, the controller controls the heating device to the ignition temperature if the first processing request and the second processing request are standing. Therefore, since the temperature of the heating device is raised to the ignition temperature from a pre-heated state to the pre-heating temperature, the ignition temperature can be quickly reached, and deterioration of emission caused by the ignition delay of the fuel supplied to the catalyst can be suppressed.

Preferably, the controller further controls the heating device to the ignition temperature until the first processing request no longer stands if the second processing request no longer stands after the first and second processing requests stand. In this aspect, once the heating device is controlled to the ignition temperature, the ignition lasts until the first processing request no longer stands, and thus, the processing of the catalyst requested by the first processing request can be executed in a short time.

Preferably, the first processing request stands on condition that the exhaust purification catalyst requires supply of fuel to the exhaust passage and combustion of the supplied fuel. More preferably, the first processing request stands on condition that the temperature of the exhaust purification catalyst is less than a predetermined value.

If the exhaust purification catalyst is an occlusion-reduction type NOx catalyst, the first processing request preferably stands on condition that the NOx occlusion amount of the exhaust purification catalyst is larger than the predetermined value.

If the exhaust purification catalyst is a selective reduction type NOx catalyst, the first processing request preferably stands on condition that the reducing agent occlusion amount of the exhaust purification catalyst is smaller than the predetermined value. The selective reduction type NOx catalyst includes those using urea aqueous as a reducing agent, those using ammonium, and those using fuel (HC).

If the exhaust purification catalyst is an HC adsorption catalyst, the first processing request preferably stands on condition that the HC adsorption amount of the exhaust purification catalyst is larger than the predetermined value.

Preferably, the first processing request stands on condition that the SOx accumulated amount of the exhaust purification catalyst is larger than the predetermined value.

Preferably, the second processing request stands on at least either one of conditions that the vehicle is decelerating or the internal combustion engine is idling.

Solutions to the problems in the present invention can be used in combination as much as possible.

Advantages of the Invention

According to the present invention, deterioration of emission caused by an ignition delay of the fuel supplied to the catalyst can be suppressed.

BEST MOST FOR CARRYING OUT THE INVENTION

<First Embodiment>

Figure 1:
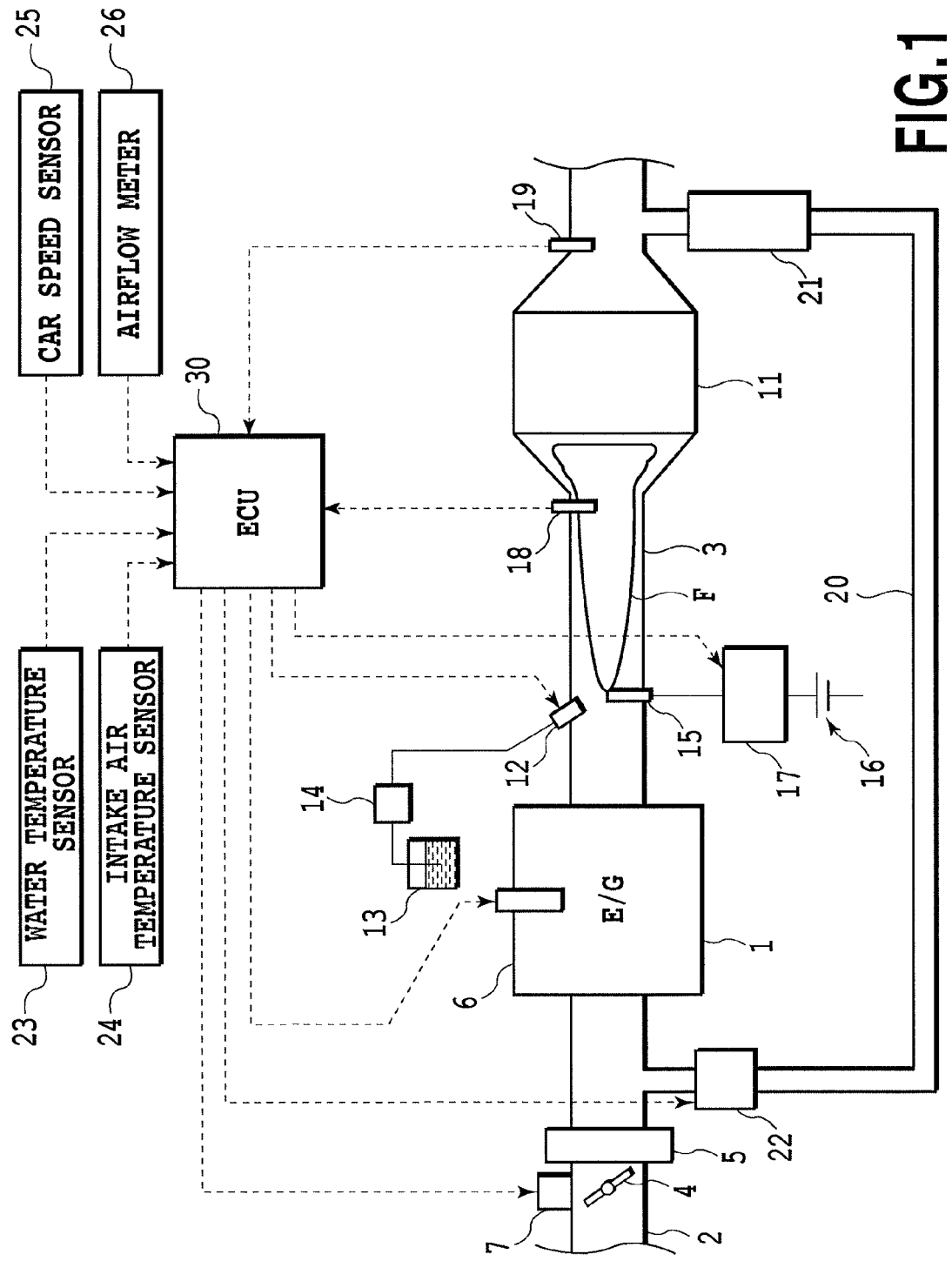
FIG. 1 is a conceptual diagram of an embodiment of the present invention.

A first embodiment of the present invention will be described below. In FIG. 1, an exhaust purification system of an internal combustion engine of the first embodiment has an engine main body 1, an intake pipe 2, and an exhaust pipe 3. The engine main body 1 is a diesel internal combustion engine but may be an internal combustion engine of other types.

In the intake pipe 2, a throttle valve 4 and a surge tank 5 are arranged. The throttle valve 4 is driven by a throttle actuator 7. Injectors 6 for running are provided toward combustion chambers of the engine main body 1.

The exhaust pipe 3 has the left side in FIG. 1 being the upstream side and is connected to the engine main body 1 and the right side in the figure being the downstream side and is connected to a muffler, not shown. A catalyst 11 is provided in the exhaust pipe 3. The catalyst 11 is formed as an oxidation catalyst and can use $Pt/CeO_2$, $Mn/CeO_2$, $Fe/CeO_2$, $Ni/CeO_2$, $Cu/CeO_2$ and the like, for example, as a catalytic substance. Cordierite or metal is used as a base material of the catalyst 11.

In the exhaust pipe 3 upstream the catalyst 11, an injector 12 for heating catalyst is installed with the injection port thereof faced toward the inside of the exhaust pipe 3. Fuel in the fuel tank 13 is supplied to the injector 12 through a pump 14. In order to promote combustion, a pipeline, a control valve, and a compressor for supplying air for combustion from the outside to the inside of the exhaust pipe 3 may be provided.

In the exhaust pipe 3 downstream the injector 12, a glow plug 15 is provided. To the glow plug 15, a DC power source 16 for feeding power to it and a drive circuit 17 are connected. The glow plug 15 is an electrothermal heating device and capable of igniting fuel supplied from the injector 12 by heating. As a heating device, a ceramic heater may be used instead of the glow plug.

In the exhaust pipe 3 upstream the catalyst 11, an exhaust temperature sensor 18 is installed. In the exhaust pipe 3 downstream the catalyst 11, a NOx sensor 19 is installed. A water temperature sensor 23 is installed in a water jacket of the engine main body 1. In the periphery of the throttle valve 2 in the intake pipe 2, an intake air temperature sensor 24 is installed. Each of the sensors 18, 23, and 24 has a thermistor whose resistance value is changed in accordance with temperature and it detects a temperature change by a resistance-value change of the thermistor. The NOx sensor 19 includes a solid electrolyte, for example. In the periphery of a driving wheel, not shown, a car speed sensor 25 is installed to detect the car speed of a vehicle on which the engine main body 1 is mounted is installed. In the intake pipe 2 in the periphery of the throttle valve 4, an airflow meter 26 for detecting an intake air amount.

An EGR (exhaust gas recirculation) passage 20 is provided connecting the exhaust pipe 3 downstream the catalyst 11 and the intake pipe 2 downstream the surge tank 5. In the EGR passage 20, an intercooler 21 for cooling the exhaust gas and an EGR control valve 22 for controlling a flow rate are arranged.

Operations of the throttle actuator 7, the pump 14, the glow plug 15, the booster circuit 17, and the EGR control valve 22 are controlled by an ECU (electronic control unit) 30.

The ECU 30 is a known one-chip microprocessor and includes a CPU, a ROM, a RAM, a nonvolatile storage device, input/output interfaces, an A/D converter, and a D/A converter. To the input interface of the ECU 30, various sensors for detecting the state of the vehicle including the engine operation state and the operation input state are electrically connected, and a signal is inputted thereto. These various sensors include a throttle opening sensor, a crank angle sensor, and an accelerator pedal sensor in addition to the above-described exhaust temperature sensor 18, the NOx sensor 19, the water temperature sensor 23, the intake air temperature sensor 24, the car speed sensor 25, and the airflow meter 26.

To the output interface of the ECU 30, the injectors 6 and 12, the pump 14, the drive circuit 17, and the EGR control valve 22 are electrically connected, and a control signal is outputted therefrom. The ECU 30 calculates a fuel supply instruction amount on the basis of parameters indicating the state of the vehicle including the detected value of each sensor and particularly the operation state of the engine main body 1 and outputs a control signal so as to open the injectors 6 and 12 for a time in accordance with the instruction amount. Fuel in an amount according to the fuel supply instruction amount is supplied from the injectors 6 and 12 in accordance with this control signal.

The ROM of the ECU 30 stores various programs, maps and reference values/initial values. The reference values stored in the ROM include a pre-heating temperature T1 and an ignition temperature T2 which are reference values of a glow-plug temperature used in processing described later, and reference values used for determining whether or not a catalyst request and a processing execution request are standing.

An operation of the first embodiment thus configured will be described by referring to the flowchart in FIG. 2 and a time chart in FIG. 3. In the first embodiment, the injector 12 and the glow plug 15 are used for warming-up the catalyst 11. The flowchart in FIG. 2 is repeatedly executed at every predetermined time during the operation of the engine main body 1.

Figure 2:
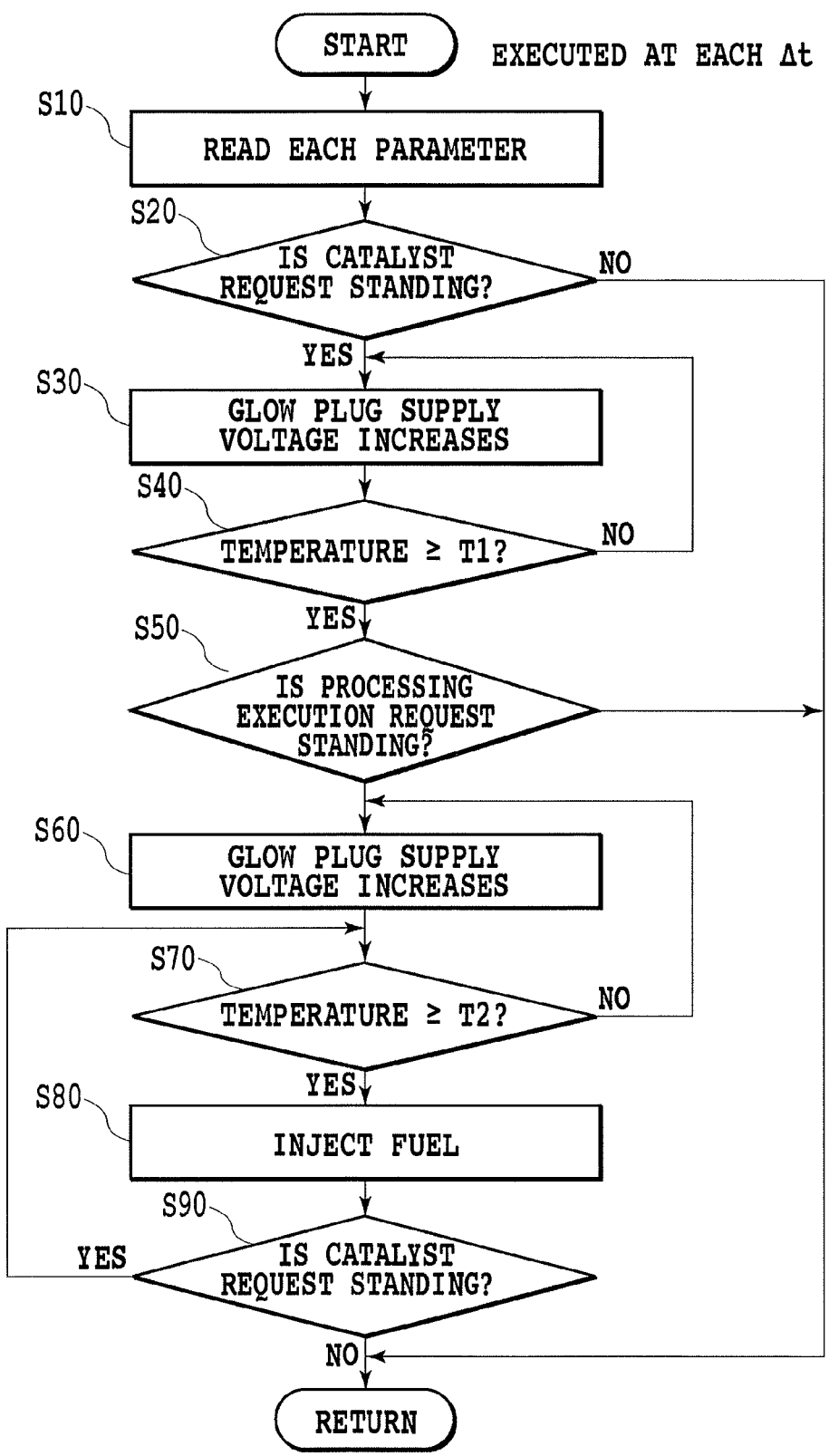
FIG. 2 is a flowchart illustrating glow plug heating and fuel supply processing.
Figure 3:
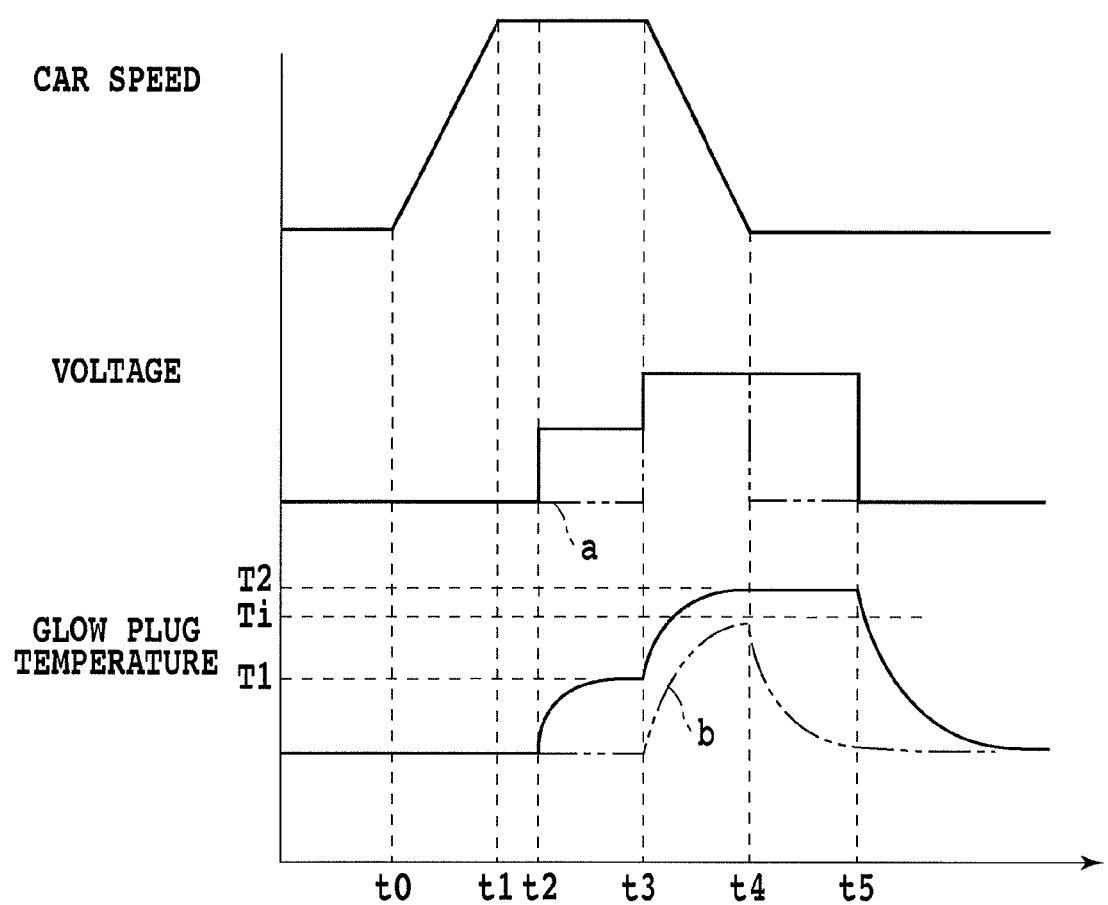
FIG. 3 is a time chart illustrating a car speed, a supply voltage to the glow plug, and a glow-plug temperature in the embodiment.

In FIG. 2, first, the ECU 30 reads a value of each parameter relating to the state of the catalyst 11 and the operation state of the vehicle (S10). The parameters read in here include an exhaust temperature detected by the exhaust temperature sensor 18, a cooling water temperature detected by the water temperature sensor 23, an intake air temperature detected by the intake air temperature sensor 24, and an operation state of the EGR control valve 22.

Subsequently, the ECU 30 determines whether or not the first processing request based on the state of the catalyst 11 (hereinafter referred to as a "catalyst request" as appropriate) is standing (S20). In this embodiment, if an estimated catalyst temperature is lower than a predetermined value, the catalyst request is standing. The estimated catalyst temperature is calculated by the ECU 30 by using a predetermined function or map on the basis of the exhaust temperature, cooling water temperature, intake air temperature, and the operation state of the EGR control valve, for example. The ECU 30 compares the calculated estimated catalyst temperature with a predetermined reference value and if the estimated catalyst temperature is lower than the reference value, the ECU 30 determines that the catalyst request is standing. If the catalyst request is not standing, a negative answer is given at Step S20, and the processing is returned.

If a positive answer is given at Step S20, that is, if the catalyst request is standing, the ECU 30 performs a control output to the drive circuit 17 so as to increase the voltage supplied to the glow plug 15 (S30). This voltage increase is repeatedly executed until the glow plug 15 reaches a pre-heating temperature T1 (S40). This pre-heating temperature T1 is lower than the ignition threshold value Ti (See FIG. 3) capable of igniting the fuel.

Subsequently, the ECU 30 determines whether or not a second processing request based on the operation state of the vehicle (hereinafter referred to as a "processing execution request" as appropriate) is standing (S50). In this embodiment, the processing execution request is standing if the car speed detected by the car speed sensor 25 is decelerating. If the car speed is not decelerating, the processing execution request does not stand, and a negative answer is given at Step S50, and the processing is returned.

If a positive answer is given at Step S50, that is, if the processing execution request is standing, the ECU 30 performs a control output to the drive circuit 17 and further increases the voltage supplied to the glow plug 15 (S60). This voltage increase is repeatedly executed until the glow plug 15 reaches the ignition temperature T2 (S70). This ignition temperature T2 is higher than the ignition threshold value Ti capable of igniting the fuel.

On condition that the distal end portion of the glow plug 15 reaches the ignition temperature T2, the ECU 30 controls the injector 12 so as to inject the fuel into the exhaust pipe 3 (S80). The fuel injected from the injector 12 is ignited by the glow plug 15 and combusted. Flame F generated by this combustion heats the catalyst 11. Since it is guaranteed that the glow plug 15 has reached the ignition temperature T2 at the time when the fuel is injected (S70), misfiring of the fuel is suppressed.

Subsequently, the ECU 30 determines again whether or not the first processing request (that is, the catalyst request) is standing (S90). Until the catalyst request is no longer standing, the processing from Step S60 to Step S80 is repeatedly executed. Therefore, even if the processing execution request is no longer standing after the catalyst request and the processing execution request were standing (S20, S50), the glow plug 15 is continuously controlled at the ignition temperature T2 until the catalyst request is no longer standing. If the catalyst request is no longer standing, that is, if the catalyst temperature becomes higher than a predetermined value, a negative answer is given at Step S90 and the processing is returned.

Changes in the car speed, the glow plug supply voltage and the glow-plug temperature when the above-described series of processing is executed will be described in accordance with the time chart in FIG. 3. When the car speed rises from the idling state (t0) and the catalyst request based on the state of the catalyst 11 is standing (S20) during running at a constant speed, the glow plug 15 is controlled to the pre-heating temperature T1 lower than the ignition temperature T2 (S30, S40, t2) until the processing execution request based on the operation state of the vehicle (S50) stands. Then, if deceleration of the vehicle is detected (t3), the catalyst request and the processing execution request stand (positive at S50), and thus, the glow plug 15 is controlled to the ignition temperature T2 (t3). Even if the deceleration is finished (t4) and the processing execution request no longer stands, the temperature of the glow plug 15 is continuously executed until the catalyst request no longer stands (t5).

If pre-heating from Step S20 to Step S40 is not performed, in response to the detection of deceleration of the vehicle (t3), the power feed to the glow plug 15 is started (two-dot chain line a), but due to a delay in temperature rise of the glow plug 15, the temperature of the glow plug 15 does not reach the ignition threshold value Ti by the end of the deceleration (t4) (two-dot chain line b) or even if reached, deterioration of emission cannot be suppressed due to the delay in ignition. On the contrary, in this embodiment, since the pre-heating is performed, the ignition temperature T2 can be quickly reached.

As thus described in detail, in this embodiment, the ECU 30 controls the glow plug 15 to the pre-heating temperature T1 lower than the ignition temperature T2 (S30, S40) when the catalyst request based on the state of the catalyst 11 is standing (S20) and the processing execution request based on the operation state of the vehicle (S50) is not standing. When the catalyst request and the processing execution request are both standing, the glow plug is controlled to the ignition temperature T2. Therefore, since the temperature of the glow plug 15 is raised to the ignition temperature T2 from the pre-heated state to the pre-heating temperature T1, the ignition temperature T2 can be quickly reached, and deterioration of emission caused by a delay in ignition of the fuel supplied to the catalyst 11 can be suppressed. Moreover, if the glow plug 15 is pre-heated all the time, energy loss during standby time would be large, but since the pre-heating is started at the time when the catalyst request stands in this embodiment, energy consumption required for pre-heating can be suppressed.

Moreover, in this embodiment, after the catalyst request and the processing execution request were standing (S20, S50), even if the processing execution request no longer stands, the ECU 30 controls the glow plug 15 to the ignition temperature T2 until the catalyst request no longer stands (S90). Therefore, once the glow plug 15 is controlled to the ignition temperature T2, the ignition is continued (S90) until the catalyst request no longer stands, and thus, processing of the catalyst 11 requested by the catalyst request can be executed in a short time.

In order to favorably combust the fuel supplied from the injector 12, the fuel supply and ignition are preferably performed in the operating state in which oxygen concentration in the exhaust gas is high (during deceleration of the vehicle or idling of the engine main body 1, for example). Thus, the second processing request (processing execution request) may be set to stand on at least either one of the conditions of deceleration of the vehicle and idling of the engine main body 1.

<Second Embodiment>

Subsequently, a second embodiment of the present invention will be described. The second embodiment is configured such that an occlusion-reduction type $NO_x$ catalyst (NSR: $NO_x$ Storage Reduction) is used as the catalyst 11. In this case, the catalyst 11 is formed by carrying precious metal such as platinum Pt as a catalyst component and a $NO_x$ absorption component on the surface of a base material formed of an oxide such as alumina $Al_2O_3$ or the like. The $NO_x$ absorption component is made of at least one selected alkali metal such as potassium K, sodium Na, lithium Li, cesium Cs and the like; alkali earth such as barium Ba, calcium Ca and the like; and rare earth such as lanthanum La, yttrium Y and the like.

The catalyst 11 which is an occlusion-reduction type NOx catalyst performs NOx absorption/emission action in which it absorbs NOx (nitrogen oxide) when the air-fuel ratio of the exhaust gas flowing therein to is leaner than a predetermined value (typically, a theoretical air-fuel ratio), while it emits the absorbed NOx if the oxygen concentration in the exhaust gas flowing therein to becomes lower. Since a diesel engine is used in this embodiment, the exhaust air/fuel ratio is lean in a normal time and the catalyst 11 absorbs NOx in the exhaust gas. Moreover, if the fuel as a reducing agent is supplied on the upstream side of the catalyst 11 and the air/fuel ratio of the inflow exhaust gas becomes rich, the catalyst 11 emits the absorbed NOx. Then, this emitted NOx reacts with the reducing agent and is reduction-purified.

In the second embodiment, the first processing request (catalyst request) stands on condition that the NOx occlusion amount of the catalyst 11 is larger than the predetermined value. The NOx occlusion amount can be estimated by a predetermined function or map using an integrated value from execution of the previous reduction processing of the exhausted NOx amount obtained from a fuel injection mount from the injector 6 and an engine rotation number Ne.

The higher the engine rotation number Ne becomes or the larger the fuel injection amount becomes, the more the NOx exhaust amount increases. The ECU 30 obtains the NOx exhaust amount corresponding to an actual engine operating state, that is, the engine rotation speed NE and the fuel injection amount and integrates the amount momentarily. An accelerator opening degree or a throttle opening degree can be used instead of the fuel injection amount, for example.

In the second embodiment, if the NOx occlusion amount which is an integrated amount of this NOx exhaust amount exceeds a predetermined reference NOx occlusion amount, it is determined that the catalyst request is standing, while if the NOx occlusion amount does not exceed the reference NOx occlusion amount, it is determined that the catalyst request is not standing. The reference NOx occlusion amount may be a constant value or dynamically obtained as a function of the temperature of the catalyst 11. The remaining processing and mechanical configuration of the second embodiment are the same as those in the first embodiment.

In the second embodiment thus configured, and in the third to seventh embodiments described below, since the temperature of the glow plug 15 is raised from the pre-heated state to the pre-heating temperature T1 to the ignition temperature T2 similarly to the first embodiment, the ignition temperature T2 can be quickly reached, and deterioration of emission caused by the ignition delay of the fuel supplied to the catalyst 11 can be suppressed. Moreover, once the glow plug 15 is controlled to the ignition temperature T2, the ignition is continued until the catalyst request does no longer stand (S90), and thus, the processing of the catalyst 11 requested by the catalyst request can be executed in a short time.

<Third Embodiment>

Subsequently, a third embodiment of the present invention will be described. The third embodiment is configured with the catalyst 11 as an occlusion-reduction type NOx catalyst similarly to that in the second embodiment, and the first processing request is obtained on the basis of the NOx purification amount.

The NOx purification amount is a value indicating NOx purification capability of the catalyst 11 and is obtained by subtracting the NOx amount on the downstream of the catalyst from an estimated NOx exhaust amount from the engine main body 1. The estimated NOx exhaust amount is estimated on the basis of the engine's operating state, that is, the engine rotation speed NE and the fuel injection amount (the accelerator opening degree or the throttle opening degree may be used instead). The NOx amount on the downstream of the catalyst is detected by the NOx sensor 19. The NOx purification capability of the catalyst 11 differs depending on the catalyst bed temperature. Thus, the ECU 30 determines whether or not the first processing request (catalyst request) is standing on the basis of the NOx purification amount and the current catalyst bed temperature. That is, the ECU 30 determines that the catalyst request is standing if the NOx purification amount is larger than a reference value according to the current catalyst bed temperature and determines that the catalyst request is not standing if the NOx purification amount is smaller than the reference value according to the current catalyst bed temperature on the contrary. The remaining processing and mechanical configuration of the third embodiment are the same as those in the above-described first embodiment.

The first processing request may be obtained by another parameter relating to deterioration of the purification capability of the catalyst 11. For example, since the larger the deterioration degree of the catalyst is, the lower the reaction heat in the catalyst becomes, it may be determined whether the catalyst request is standing or not on the basis of the estimated catalyst bed temperature calculated from the exhaust temperature, the fuel supply amount from the injector 12, and the air-fuel ratio of the engine main body 1 and the current catalyst bed temperature detected by a temperature sensor (not shown) provided in the catalyst 11. In this case, the ECU 30 can determine that the catalyst request is standing if the difference between the former and the latter is large (or a ratio of the latter to the former is small), or on the contrary, the ECU 30 can determine that the catalyst request is not standing if the difference between the former and the latter is small (or the ratio of the latter to the former is large).

<Fourth Embodiment>

Subsequently, a fourth embodiment of the present invention will be described. The fourth embodiment is configured with the catalyst 11 as a urea selective-reduction type NOx catalyst (SCR: Selective Catalytic Reduction). In this case, the catalyst 11 can be configured as those carrying precious metal such as Pt on the surface of a base material such as zeolite, alumina or the like, those carrying transition metal such as Cu subjected to ion exchange on the base material surface, or those carrying titania/vanadium catalyst ($V_2O_5$/ $WO_3$/$TiO_2$) on the base material surface, for example.

In this urea selective-reduction type NOx catalyst, a urea aqueous solution is used as a reducing agent, and an apparatus is provided with an injecting device for supplying the reducing agent immediately before the catalyst 11. The supplied urea aqueous solution changes to ammonia ($NH_3$) in the exhaust gas and is occluded in the catalyst 11. Under a condition that the air-fuel ratio of the inflow exhaust gas is lean, HC and NO in the exhaust gas react with ammonia occluded into the catalyst 11 steadily and simultaneously and purified to $N_2$, $CO_2$, and $H_2O$. Ammonium may be also used as a reducing agent.

In the fourth embodiment, the first processing request (catalyst request) stands on condition that the ammonium occlusion amount of the catalyst 11 is smaller than a predetermined value. The ammonium occlusion amount can be calculated by subtracting the ammonium consumption amount from the ammonium supply amount to the catalyst 11, for example. The ammonium supply amount can be obtained by a predetermined function or map on the basis of the integrated amount of the supplied urea aqueous solution and the estimated catalyst temperature (this can be calculated on the basis of an engine cooling water temperature or the like). The ammonium consumption amount can be obtained by a predetermined function or map on the basis of the estimated NOx exhaust amount (this can be calculated on the basis of a fuel injection amount from an in-cylinder fuel injection valve) and the estimated catalyst temperature. The remaining processing and mechanical configuration of the fourth embodiment are the same as those in the above-described first embodiment.

<Fifth Embodiment>

Subsequently, a fifth embodiment of the present invention will be described. The fifth embodiment is configured with the catalyst 11 as an HC selective-reduction type NOx catalyst (HC-SCR). In this case, the catalyst 11 can be configured by those carrying silver-added alumina ($Ag/Al_2O_3$) on a ceramic honeycomb, or using zeolite, for example. The catalyst 11 selectively reduces NOx to $N_2$ in a temperature region from approximately 250 to 600° C., for example, by using light oil (hydrocarbon, HC) as a reducing agent.

In the fifth embodiment, the first processing request (catalyst request) stands on condition that the HC occlusion amount of the catalyst 11 is smaller than a predetermined value. The HC occlusion amount can be calculated by subtracting the HC consumption amount from the HC supply amount to the catalyst 11, for example. The HC supply amount can be obtained by a predetermined function or map on the basis of the integrated fuel injection amount from the injectors 6 and 12 and the estimated catalyst temperature (this can be calculated on the basis of the engine cooling water temperature and the like). The HC consumption amount can be obtained by a predetermined function or map on the basis of the estimated NOx exhaust amount (this can be calculated on the basis of the fuel injection amount from the in-cylinder fuel injection valve) and the estimated catalyst temperature. The remaining processing and mechanical configuration of the fifth embodiment are the same as those in the above-described first embodiment.

<Sixth Embodiment>

Subsequently, a sixth embodiment of the present invention will be described. The sixth embodiment is configured with the catalyst 11 as an HC adsorption catalyst. In this case, the catalyst 11 is made of zeolite (FER, MOR, FAU, MFI, β-zeolite and the like), for example, and adsorbs and holds HC at a low temperature while the catalyst 11 emits and oxidizes the adsorbed/held HC at a high temperature.

In the sixth embodiment, the first processing request (catalyst request) stands on condition that the HC adsorption is larger than a predetermined value. The HC adsorption amount can be calculated by subtracting the HC consumption amount from the HC supply amount to the catalyst 11, for example. The HC supply amount can be obtained by a predetermined function or map on the basis of the integrated fuel injection amount from the injectors 6 and 12 and the estimated catalyst temperature (this can be calculated on the basis of the engine cooling water temperature and the like). The HC consumption amount can be obtained by a predetermined function or map on the basis of time when a predetermined oxidation threshold value of the estimated catalyst temperature is exceeded and the HC adsorption amount at that time. The remaining processing and mechanical configuration of the sixth embodiment are the same as those in the above-described first embodiment.

<Seventh Embodiment>

Subsequently, a seventh embodiment of the present invention will be described. The seventh embodiment is configured with the catalyst 11 as the occlusion-reduction type NOx catalyst similar to the above-described second embodiment, and the first processing request is obtained on the basis of a SOx (sulfur oxide) accumulated amount of the catalyst 11.

SOx is considered to be generated by the bond between a sulfur component S in the fuel and oxygen $O_2$ in intake air through combustion, which is accumulated on a catalyst as a sulfate X—$SO_4$ ($Al_2(SO_4)_3$, $Ce_2(SO_4)_3$, for example). The SOx accumulated amount is calculated as an integrated value after the previous processing of sulfur concentration in the fuel and the fuel consumption amount in the engine main body 1.

The ECU 30 determines that the catalyst request stands if the SOx accumulated amount is larger than a reference value while the ECU 30 determines that the catalyst request does not stand if the SOx accumulated amount is smaller than the reference value. The remaining processing and mechanical configuration of the seventh embodiment are the same as those in the above-described first embodiment.

The present invention has been described with some degree of specificity, but it should be understood that various alterations and changes can be made without departing from the spirit and scope of the claimed invention. Various technical measures illustrated in each of the above-described embodiments and each variation can be combined with each other as much as possible. In each of the above-described embodiments and each variation, the first and second processing requests were supposed to be composed of a single type, respectively, but each may be a combination of a plurality of types of processing requests.

REFERENCE SIGNS LIST 3 exhaust pipe
11 catalyst
6, 12 injector
14 pump
15 glow plug
18 exhaust temperature sensor
19 NOx sensor
20 EGR passage
22 EGR valve
30 ECU

The invention claimed is:

1. An exhaust purification system of an internal combustion engine, comprising:
an exhaust purification catalyst provided in an exhaust passage of the internal combustion engine in a vehicle;
a fuel supply device which is provided in the exhaust passage upstream the exhaust purification catalyst and supplies fuel to an exhaust gas flowing into the exhaust purification catalyst;
a heating device which heats the fuel supplied from the fuel supply device; and
a controller which controls the heating device, wherein
the controller controls the heating device to a pre-heating temperature lower than an ignition threshold value capable of igniting the fuel by supplying power to the heating device without performing fuel supply by the fuel supply device when a first processing request which stands if a state of the exhaust purification catalyst requires combustion of the fuel is standing and a second processing request which stands if an operating state of the vehicle allows exhaust oxygen concentration suitable for combustion of the fuel to be supplied is not standing, and controls the heating device to an ignition temperature higher than the ignition threshold value when the first processing request and the second processing request are standing and controls the fuel supply device so that the fuel is supplied on condition that the heating device has reached the ignition temperature.

2. The exhaust purification system of an internal combustion engine according to claim 1, wherein
the controller further controls the heating device to the ignition temperature until the first processing request no longer stands if the second processing request no longer stands after the first and second processing requests stand.

3. The exhaust purification system of an internal combustion engine according to claim 1, wherein
the first processing request stands on condition that a temperature of the exhaust purification catalyst is less than a predetermined value.

4. The exhaust purification system of an internal combustion engine according to claim 1, wherein
the exhaust purification catalyst is an occlusion-reduction type NOx catalyst, and
the first processing request stands on condition that a NOx occlusion amount of the exhaust purification catalyst is larger than a predetermined value.

5. The exhaust purification system of an internal combustion engine according to claim 1, wherein
the exhaust purification catalyst is a selective-reduction type NOx catalyst, and
the first processing request stands on condition that a reducing-agent occlusion amount of the exhaust purification catalyst is smaller than a predetermined value.

6. The exhaust purification system of an internal combustion engine according to claim 1, wherein
the exhaust purification catalyst is an HC adsorption catalyst, and
the first processing request stands on condition that an HC adsorption amount of the exhaust purification catalyst is larger than a predetermined value.

7. The exhaust purification system of an internal combustion engine according to claim 1, wherein
the first processing request stands on condition that a SOx accumulated amount of the exhaust purification catalyst is larger than a predetermined value.

8. The exhaust purification system of an internal combustion engine according to claim 1, wherein
the second processing request stands on at least either one of conditions that the vehicle is decelerating or the internal combustion engine is idling.

* * * * *